United States Patent
Antell et al.

(10) Patent No.: US 8,621,562 B2
(45) Date of Patent: *Dec. 31, 2013

(54) METHODS AND SYSTEMS FOR AUTHENTICATION

(75) Inventors: Richard Antell, Sherborn, MA (US); Michael Arena, Lexington, MA (US); Michele Chraplewski, Wakefield, MA (US); Robert D. Shapiro, Arlington, MA (US)

(73) Assignee: Visa International Service Association, San Francisco, CA (US)

( * ) Notice: Subject to any disclaimer, the term of this patent is extended or adjusted under 35 U.S.C. 154(b) by 96 days.

This patent is subject to a terminal disclaimer.

(21) Appl. No.: 12/949,553

(22) Filed: Nov. 18, 2010

(65) Prior Publication Data

US 2011/0067094 A1 Mar. 17, 2011

Related U.S. Application Data

(63) Continuation of application No. 10/732,668, filed on Dec. 10, 2003, now Pat. No. 7,853,984.

(60) Provisional application No. 60/432,487, filed on Dec. 11, 2002.

(51) Int. Cl.
*G06F 7/04* (2006.01)

(52) U.S. Cl.
USPC ............... 726/2; 726/4; 726/17; 713/182

(58) Field of Classification Search
USPC .......... 726/2–7, 16–18, 26–30; 713/182–186; 705/64, 67, 50; 709/223, 225, 229; 707/705, 783, 784
See application file for complete search history.

(56) References Cited

U.S. PATENT DOCUMENTS

| | | | |
|---|---|---|---|
| 5,719,560 A | 2/1998 | Watkins | |
| 6,263,447 B1 | 7/2001 | French et al. | |
| 6,282,658 B2 | 8/2001 | French et al. | |
| 6,321,206 B1 | 11/2001 | Honarvar | |
| 6,321,339 B1* | 11/2001 | French et al. | 726/2 |
| 6,356,909 B1* | 3/2002 | Spencer | 707/999.01 |
| 6,430,545 B1 | 8/2002 | Honarvar et al. | |
| 6,496,936 B1 | 12/2002 | French et al. | |
| 6,542,583 B1* | 4/2003 | Taylor | 379/88.02 |
| 6,650,736 B1 | 11/2003 | Unger et al. | |
| 6,711,681 B1 | 3/2004 | Al-Salqan et al. | |
| 6,921,268 B2* | 7/2005 | Bruno et al. | 434/323 |
| 7,051,209 B1 | 5/2006 | Brickell | |
| 7,234,156 B2 | 6/2007 | French et al. | |

(Continued)

*Primary Examiner* — Nirav B Patel
(74) *Attorney, Agent, or Firm* — Kilpatrick Townsend & Stockton LLP

(57) ABSTRACT

Disclosed are systems and methods of authenticating a user on a network, including, based on identity information received from the user, accessing at least one data source to retrieve data associated with the user, comparing the retrieved data against a listing of possible questions associated with the retrieved data to determine associations between the retrieved data and the listing of possible questions, based on a ranking of the listing of possible questions, formulating at least one question set using questions within the listing of possible questions for which retrieved data is available, where each of the at least one question set includes at least two different questions, causing at least some of the questions from the at least one question set to be presented to the user, and, based on responses to the questions from the user, determining whether the user is authenticated.

38 Claims, 3 Drawing Sheets

(56) References Cited

U.S. PATENT DOCUMENTS

| | | |
|---|---|---|
| 2001/0039618 A1* | 11/2001 | Azuma .......................... 713/185 |
| 2002/0053035 A1* | 5/2002 | Schutzer ....................... 713/202 |
| 2003/0093322 A1 | 5/2003 | Sciuk |
| 2003/0105959 A1 | 6/2003 | Matyas et al. |
| 2003/0126092 A1* | 7/2003 | Chihara ......................... 705/67 |
| 2003/0154406 A1* | 8/2003 | Honarvar et al. ............. 713/201 |
| 2003/0219105 A1* | 11/2003 | Unger et al. ............... 379/88.16 |
| 2004/0078603 A1 | 4/2004 | Ogura et al. |
| 2005/0039057 A1 | 2/2005 | Bagga et al. |
| 2005/0227215 A1 | 10/2005 | Bruno et al. |

* cited by examiner

METHODS AND SYSTEMS FOR AUTHENTICATION

CLAIM OF PRIORITY

This application claims benefit as a continuation of U.S. patent application Ser. No. 10/732,668 filed Dec. 10, 2003, now U.S. Pat. No. 7,853,984 which claims priority to, and incorporates herein by reference, the entire disclosure of U.S. Provisional Patent Application No. 60/432,487, filed on Dec. 11, 2002. The applicant(s) hereby rescind any disclaimer of claim scope in the parent application(s) or the prosecution history thereof and advise the USPTO that the claims in this application may be broader than any claim in the parent application(s). All applications mentioned in this paragraph are hereby incorporated by reference in their entirety, as if fully set forth herein, for all purposes.

FIELD

The methods and systems relate to authentication, and more particularly to methods and systems that authenticate network users.

BACKGROUND

Authentication systems are used for security purposes to verify the authenticity of one or more parties during a transaction. In the past, transactions were of a more personal nature, in that authentication consisted of the vendor visually recognizing the purchaser, or identifying the purchaser's voice. As transactions become ever more impersonal, additional authentication can become increasingly necessary.

Authentication systems can be manual, such as when purchasing an item with a personal check. The purchaser can present additional identification, such as a driver's license, to verify the authenticity of the purchaser. Authenticating systems can also be electronic, such as when using an Automated Teller Machine (ATM). The ATM card can include account and customer information. To guard against unauthorized access, the user of the ATM must input a Personal Identification Number (PIN). The correct PIN serves to authenticate that the user is the customer authorized to use the ATM card.

Some existing authentication schemes generally rely on information that can be readily obtained, thus compromising the authentication. For example, a fraudulent license can be provided when purchasing items by check. The Internet provides many opportunities for obtaining personal identification information, as witnessed by the increasing threat of identity theft.

SUMMARY

Authentication methods and systems can determine if an individual providing information is actually the claimed individual. A customer who wishes to have users authenticated can prioritize questions from a listing of potential questions. The methods and systems can determine "available" questions to be posed to a user to be authenticated, where the available questions are based on a set of potential questions for which information is obtained for and/or otherwise associated with the user. The information can be from a data source that can provide personal and/or corporate (e.g., user is an employee) information, such as, for example, a credit bureau (e.g., database), debit bureau, a demographic data source, a household data source, a business data source, and others, with such examples provided for illustration and not limitation. The methods and systems can formulate questions sets to be asked of the user based on the available questions, the customer's prioritization of the potential questions, and customer inputs for a number of question sets to be asked of the user and a number of questions in each question set. Each question set includes at least two questions from the available questions. The questions in the question sets are posed to the user in fill-in-the-blank format. The user's responses are analyzed to determine if they meet an authentication criteria provided by the customer.

In one embodiment, a method of authenticating a user on a network can include formulating question sets from a listing of potential questions, where the listing includes one question of a basic information type, and a plurality of questions of an authenticating type, and where each question set can have at least two different questions taken from the listing of available questions. The method can pose the questions from the question sets to the user in a fill-in-the-blank format to elicit responses from the user, and the method can analyze the responses to determine whether the responses match like information received from a data source(s) that can include personal and/or corporate/business data. Based on the match results and a customer's configuration of the methods and systems, which includes an authentication criteria, the user can be authenticated.

In formulating the question sets, the method and systems can parse the data source (e.g., credit, debit, household, business) information for the user to determine if question sets can be formulated based on the received data source information. The method thus can include configuring the authentication criteria to provide priority rankings for the questions. The formulation of the question sets can be based on the priority rankings. The questions in the question sets can be ordered and/or selected for inclusion in the question sets by their respective priority rankings, where questions in the questions sets are based on available questions for the user to be authenticated. A customer requesting authentication of the user can input configuration criteria, including the priority rankings, the number of question sets to be posed to the user, the number of questions per question set, and scoring and/or authentication criteria for the responses.

If so configured by the customer, the method can pose additional questions from a subsequent question set when responses to one or more previous question sets (and/or associated scoring) do not meet the authentication criteria. Analyzing the responses can include assigning values to the responses based on configuration criteria input by a customer requesting authentication of the user, and combining the values for the responses to obtain a combined total. In some embodiments, the combining can be by strict addition, while some embodiments may use weighting schemes. The authentication criteria can be satisfied when the combined total exceeds a predetermined total. Assigning values can include assigning weights to the responses and/or assigning values for partially correct responses.

The method can include providing instructions to the user to proceed to a manual method of authenticating when the user fails to meet the authentication criteria after a predetermined number of attempts. The manual method can include prompting the user to input access criteria provided to the user as part of the instructions, retrieving the analysis of the previous responses of the user based on the access criteria input by the user being valid, posing questions from additional question sets to the user in fill-in-the-blank format, recording user responses to the questions from the additional question sets, analyzing the responses to the questions from the additional question sets to determine whether the responses meet the authentication criteria, and providing instructions to the user to proceed to a mail method of authenticating when the access criteria is invalid, no additional question sets are available, and/or the authentication criteria is not met. The mail method can include obtaining physical specimens of user identification and determining if the physical specimens meet the authentication criteria.

BRIEF DESCRIPTION OF THE DRAWINGS

The following figures depict certain illustrative embodiments in which like reference numerals refer to like elements. These depicted embodiments are to be understood as illustrative and not as limiting in any way.

DESCRIPTION

To provide an overall understanding, certain illustrative embodiments will now be described; however, it will be understood by one of ordinary skill in the art that the systems and methods described herein can be adapted and modified to provide systems and methods for other suitable applications and that other additions and modifications can be made without departing from the scope of the systems and methods described herein.

Unless otherwise specified, the illustrated embodiments can be understood as providing exemplary features of varying detail of certain embodiments, and therefore, unless otherwise specified, features, components, modules, and/or aspects of the illustrations can be otherwise combined, separated, interchanged, and/or rearranged without departing from the disclosed systems or methods. Additionally, the shapes and sizes of components are also exemplary and unless otherwise specified, can be altered without affecting the scope of the disclosed and exemplary systems or methods of the present disclosure.

The methods and systems described herein provide schemes and platforms to authenticate a user of a network. The systems and methods described herein can provide authentication over a variety of networks, including computer networks and telephone networks. The methods and systems can also be manually deployed to provide a network user with such authentication. In addition, the methods and systems can be components of authentication methods and systems, or can be presented in a stand-alone mode.

Figure 1:
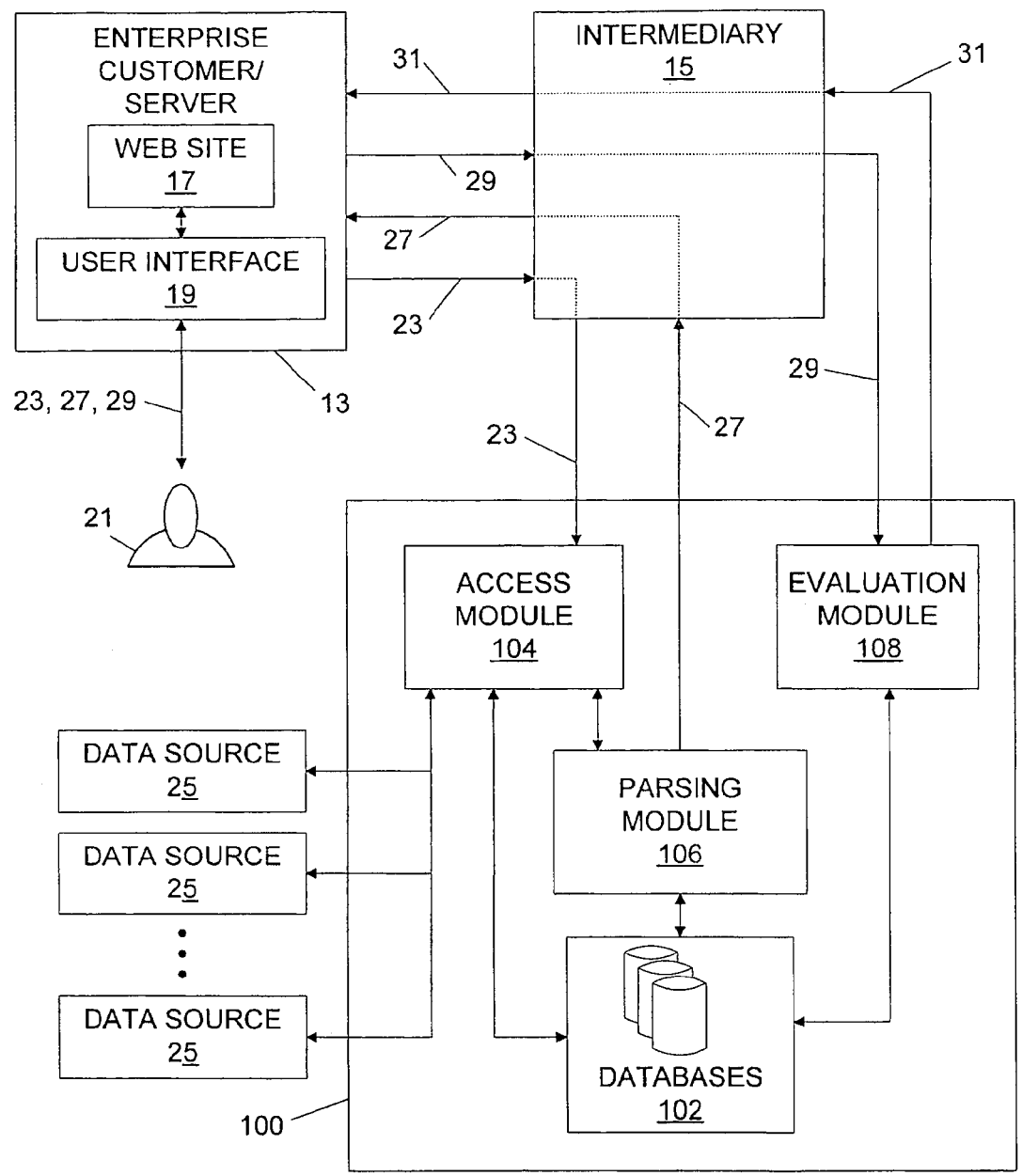
FIG. 1 illustrates a block diagram of a system for authentication.

Referring to FIG. 1, there is shown one embodiment of an authentication system 100 that can be a component of a system 11 that can include an Customer 13 and, optionally, an Intermediary 15. FIG. 1 can illustrate a simplified representation of communications between various components of the authentication system 100 rather than showing detailed features of the components. The authentication system 100 can include an embodiment for authenticating computer network users. Although FIG. 1 illustrates system 11 employing an Intermediary 15, other systems may not include an Intermediary 15, and thus communications between the authentication system 100 and the Customer 13 can be direct.

With reference to FIG. 1, Customer 13 can be associated with a server and/or another microprocessor-controlled device that can be associated with a web site or page 17, or other site of Customer 13 that can be accessed via user interface 19 presented to a network User 21. For User 21 to access site 17 or portions thereof, Customer 13 can request authentication of User 21. Prior to authentication of any User 21, and preferably during a configuration or installation period for authentication system 100, Customer 13 can configure authentication system 100 based on a number of parameters including sample questions, and configuration and authentication criteria parameters. Customer 13 can thus configure authentication system 100 directly, without communications through Intermediary 15.

Table A includes an example listing of some potential questions from which question sets can be formed. As will be described herein, based on the configuration data and retrieved data source data associated with the User 21 to be authenticated, authentication system 100 can compile question sets using available questions from Table A, "Potential Questions", and can provide the question sets to User 21 via interface 19 of Customer 13 or other means. The questions in Table A are merely exemplary, and can include fewer and/or more information that can be obtained from a credit bureau and/or another data source(s) as provided herein. In some embodiments, the data source(s) can be an independent and/or secure data source.

TABLE A

EXAMPLE POTENTIAL QUESTIONS
Question

Mortgage Account
Mortgage Payment Amount
Credit Card Account
Credit Card Limit
Auto Loan Account
Auto Loan Payment Amount
Education Loan Account
Education Loan Payment Amount
Previous Address Street
Bank/Institution Holding Mortgage
Bank/Institution Holding Auto Loan
Bank/Institution Holding Education Loan
Place of Employment
Consumer Statement Content Customer 13 can specify configurable question set parameter values including a maximum number of question sets, a number of questions in the different question sets, a number of correct answers or percentage of correct answers to provide authentication, etc. Table B, "Configurable Question Set/Authentication/Scoring Parameters," provides an example listing of configurable parameters, including default and/or suggested values for the parameters. The Table B parameters are also for illustration and not limitation, and fewer or more parameters can be employed, where the suggested values can be similarly viewed as examples.

As Table B indicates, a Customer 13 can provide one or more authentication and/or scoring criteria that can include a number of questions to correctly answer (e.g., a minimum number), a percentage of questions to answer correctly, a number of questions to answer partially correct (e.g., "borderline" correct), and/or a percentage of questions to answer partially correct (e.g., "borderline" correct).

Table C, "Configurable Scoring/Authentication Parameters," provides an example listing of scoring parameters and example default or suggested values related thereto, for scoring the answers and/or responses from the User 21, and includes points awarded for correct or partially correct/borderline answers, multipliers for correct answers, multipliers for partially correct ("borderline") answers, thresholds and/or criteria for determining whether an answer is "correct" and thus entitled to the points and "correct" multiplier, and thresholds and/or criteria for determining whether an answer is "borderline" and/or partially correct and thus entitled to the points and "borderline" multiplier. Accordingly, as an example, consider the configuration shown in Table C, where mortgage payment amount for a given User 21 can be $1,000, as provided by a credit bureau (or other data source). For the Table C configuration, a response from the User 21 of $950 to $1050 would yield a point of 1.0 with a multiplier of 1.0, providing a score of 1.0 for that response. Further, a response from the User 21 of $900 to $949 or $1051 to $1100 would yield a point of 1.0 with a multiplier of 0.75, providing a score of 0.75. As seen from the configuration of Table C, with the present example, no other response from the User 21 would generate a non-zero score (e.g., other responses can be deemed "incorrect"). The aforementioned score may be used, for example, as a partial score towards the criteria of Table B. Accordingly, the aforementioned example is merely for illustrative purposes and is a demonstration of some possible answer/response scoring schemes in which one or more multipliers and/or answer criteria/thresholds can be employed. It can be understood that fewer or more scoring parameters may be used, and/or with different default values.

TABLE B

EXAMPLE CONFIGURABLE QUESTION SET/AUTHENTICATION/SCORING CRITERIA

| Configurable Parameter | Suggested/Default Value |
| --- | --- |
| Maximum Number of Question Sets | 2 |
| Number of Questions per Question Set | 3 (minimum value: 2) |
| Authentication Score High Number of Questions Correct | >=3 |
| Authentication Score High Percentage of Questions Correct | >=60% |
| Authentication Score Borderline Number of Questions Correct | >=2 |
| Authentication Score Borderline Percentage of Questions Correct | >=50% |

As provided herein, during a configuration session, Customer 13 can access and/or otherwise provided data relative to the configuration data and/or information such as that illustrated in Tables A, B and C, and the Customer 13 can accept the default values for the parameters shown therein, and/or can input, specify, and/or otherwise provide values for one or more of the parameters. As shown in Table C, the Table A questions can be assigned priority values (e.g., by a Customer, system administrator, etc.). It can be understood that, based on the respective information from data sources from which answers to Table A are sought, answers to all of the Table A questions may not be available for every User 21. Accordingly, the potential questions of Table A may be reduced to a smaller number of "available" questions that include the Table A (or other set) questions for which answers are available. Thereafter, based on the configurable question set parameters of Table B (or other set), question sets can be formulated, where a question set must include at least two questions, i.e., Customer 13 can not configure a question set having less than two questions. The configuration data can be stored by system 100 in one or more databases 102.

Figure 2:
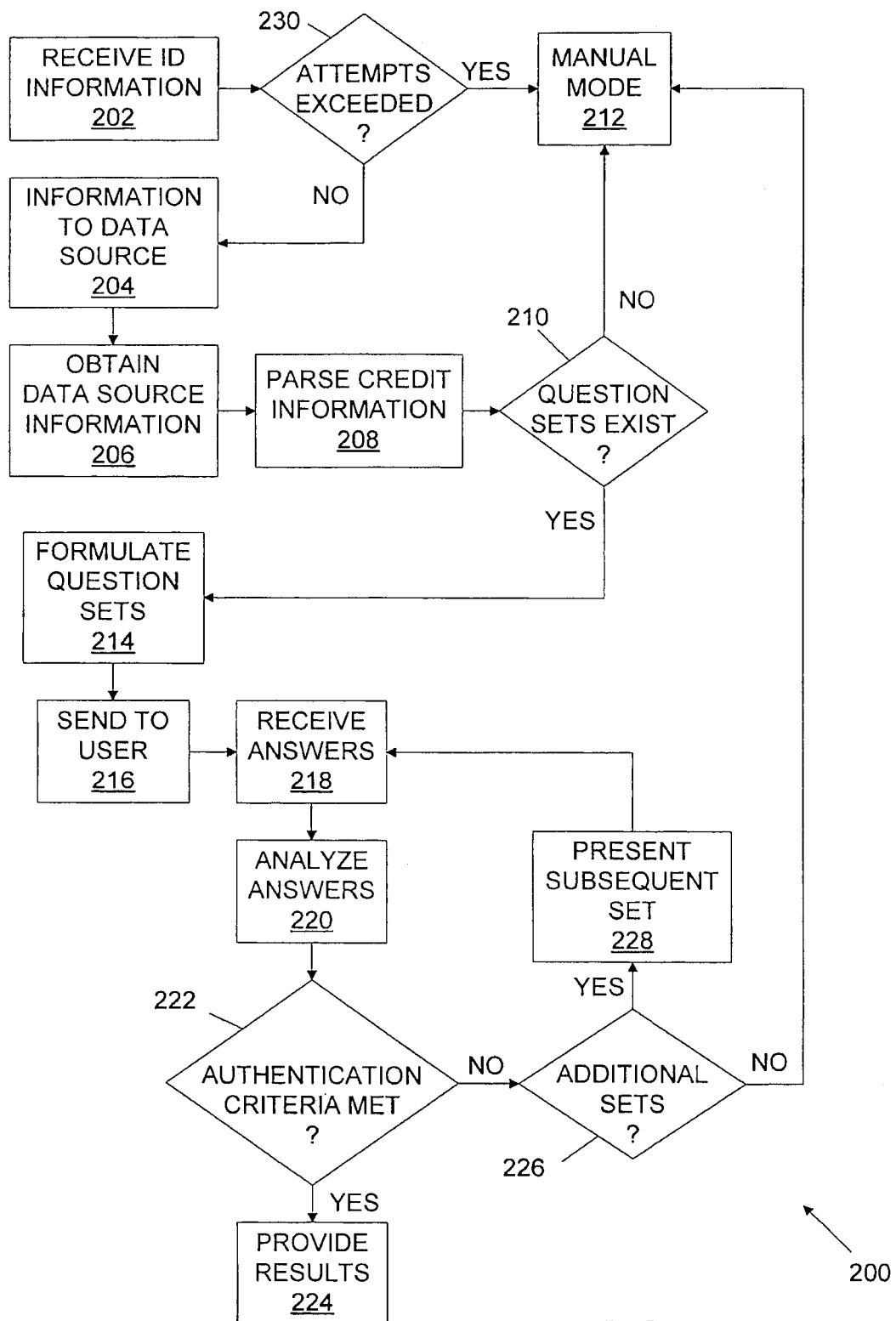
FIG. 2 illustrates a flow chart of a method of authentication over a network.

Once Customer 13 completes configuration, Customer 13 can use authentication system 100 for authentication of one or more Users 21. Referring also to FIG. 2, method 200 can illustrate one embodiment of the operation of the disclosed authentication method and system 100 in a web mode. Customer 13 can prompt User 21 for identity information that can include, for example, name (first/last), address (street, city, state, ZIP code), home phone number, work phone number, social security number, email address, and optionally, date of birth and driver's license number and state. Customer 13 can receive (via web site 17, etc.) the User's identity information and can provide it to authentication system 100, as indicated by the arrows 23 in FIG. 1. As provided previously, although this information exchange is shown via the Intermediary 15 in FIG. 1, it is not necessary to include the Intermediary 15. Some embodiments may employ more than one Intermediary 15.

TABLE C

EXAMPLE CONFIGURABLE SCORING/AUTHENTICATION PARAMETERS

| Question | Priority Ranking | Points | Multiplier (correct) | Multiplier (borderline) | Threshold (correct) | Threshold (borderline) |
| --- | --- | --- | --- | --- | --- | --- |
| Mortgage Account | 6 | 1 | 1 | — | — | — |
| Mortgage Payment Amount | 1 | 1 | 1 | .75 | +5% −5% | +10% −10% |
| Credit Card Account | 5 | 1 | 1 | — | — | — |
| Credit Card Limit | 9 | 1 | 1 | .75 | +10% −0% | +20% −0% |
| Auto Loan Account | 7 | 1 | 1 | — | — | — |
| Auto Loan Payment Amount | 2 | 1 | 1 | .75 | +5% −5% | +10% −10% |
| Education Loan Account | 8 | 1 | 1 | — | — | — |
| Education Loan Payment Amount | 4 | 1 | 1 | .75 | +5% −5% | +10% −10% |
| Previous Address Street | 3 | 1 | 1 | .75 | .81 | .75 |
| Bank/Institution Holding Mortgage | 13 | 1 | 1 | — | — | — |
| Bank/Institution | 12 | 1 | 1 | — | — | — |

TABLE C-continued

EXAMPLE CONFIGURABLE SCORING/AUTHENTICATION PARAMETERS

| Question | Priority Ranking | Points | Multiplier (correct) | Multiplier (borderline) | Threshold (correct) | Threshold (borderline) |
|---|---|---|---|---|---|---|
| Holding Auto Loan Bank/Institution | | | | | | |
| Holding Education Loan | 14 | 1 | 1 | — | — | — |
| Place of Employment | 10 | 1 | 1 | — | — | — |
| Consumer Statement Content | 11 | 1 | 1 | — | — | — |

When authentication system 100 receives the identity information, as at 202 in FIG. 2, access module 104 can provide (204) the identify information, or portions thereof, as access information to one or more data sources 25 to obtain (206) information associated with User 21. The access information used by access module 104, and other identity information data provided by the User 21, are not otherwise scored or used to authenticate the User. Accordingly, the access information allows the data sources to provide authentication system 100 with data associated with the User 21. For example, when the data source(s) is a credit bureau, the credit bureau can provide a full credit report, a "thin file" credit report, or an indication that information is not available based on the access information.

Parsing module 106 of authentication system 100 can parse (208) the information from the data source(s) 25 to obtain answers for potential questions (e.g., Table A potential questions). Depending on the access information provided, the data source(s) contacted, and the information available from the data source(s), answers to some or all of the Table A questions can be obtained. Only potential questions for which answers are obtained from the data source(s) ("available questions") can be asked of the User 21 during the authentication process. Based on the questions obtained and the configuration of the system (e.g., see Table B), parsing module 106 can determine, at 210, if enough available questions exist to prepare question sets as configured by Customer 13. If there are not enough available questions to generate question sets per the configuration input by Customer 13, authentication system 100 can provide User 21 with an indication that Manual Mode is necessary for authentication, as indicated at 212 in FIG. 2. In some embodiments where Manual Mode is not available, the lack of available questions to formulate the minimum number of questions sets may cause the User 21 to be denied authentication.

If question sets can be prepared (i.e., based on the number of available questions), the question sets can be prepared and/or formulated by selecting such available questions based on the priorities associated with the various available questions. Accordingly, if a question set includes two questions, the two highest priority available questions can be selected to form the question set. It can be understood that references herein to "question sets" can include formal and/or informal groupings and/or associations of questions.

Referring back to FIG. 2, parsing module 106 can formulate (214) the question sets using, for example, the Table A questions and the configuration data for Customer 13. Consider an example of Customer 13 configuring system 100 to have two question sets with four questions in each question set (e.g., from the first two rows in Table B). Parsing module 106 can formulate a first question set including the four highest-ranked available questions, based on the priority ranking provided by Customer 13 in Table C, for which data source information/data (i.e., answers or answer data) are available, and can formulate a second question set including the next four highest-ranked questions for which data source information/data are available (i.e., "available questions"). Questions in the question sets can be formulated in fill-in-the-blank format.

Authentication system 100 can cause the User 21 to be presented (e.g., via web site 17 or other means) questions from question sets. These question can be, as provided herein, in fill-in-the-blank format or another format, as at 216 in FIG. 2 and indicated by arrows 27 in FIG. 1. Evaluation module 108 of authentication system 100 can receive (218 in FIG. 2 and arrows 29 in FIG. 1) the answers of User 13 via Intermediary 19 (or directly), and can evaluate and analyze (220) the received answers via comparison to the answer data retrieved from the data source(s), and scoring the received answers with regard to scoring and/or authentication parameters and/or criteria such as, for example, the Tables B and C scoring/authentication configuration data.

Evaluation module 108 can determine, at 222, whether the scoring for the received answers satisfies the authentication criteria (e.g., see Table B), as set forth in the configuration data for Customer 13. A Customer 13 may thus configure the system to have one or more scoring/authentication criteria, as provided in Table B. For example, the Customer 13 can specify a number of questions to answer correctly and/or a number of questions to answer partially ("borderline") correctly, and one or more of such criteria can be used to determine authentication. Additionally, and/or optionally, a User 21 can be authenticated based on a percentage of questions answered correctly and/or partially ("borderline") correctly. It can be understood, as provided herein, that other scoring/authentication criteria can be used, and the aforementioned criteria can be combined through, for example, weighting and/or other methods of combination.

If one or more of specified authentication criteria are satisfied, authentication system 100 can inform (224 in FIG. 2 and arrows 31 in FIG. 1) Customer 13, User 21 and/or Intermediary 15 of the results of the evaluation. In one embodiment, when the authentication criteria is satisfied, authentication system 10 can provide an "authentication decision code", e.g., a binary value, to indicate that User 21 is authenticated. In one embodiment, the authentication code can include a Digital Certificate.

If the User 21 is not authenticated based on the first question set, and the configuration data provided by Customer 13 allows more than one question set to be presented to the User 21, as determined at 226 in FIG. 2, authentication system 100 can present (228) a second (and/or subsequent) question set(s) to User 21. Authentication system 100 can return to perform the same process of receiving answers (218), evaluating answers (220), and determining whether the authentication criteria are satisfied (222) based on the subsequent question set(s). Depending on the configuration provided by Customer 13, the scores used in the determination as to whether the authentication criteria is satisfied (e.g., see Table B) can include a combination of the results or scores of previous evaluations (e.g., a prior "login" session of the User 21, which may include a prior question set) and the results of the current evaluation (e.g., current "login" session of the User 21), and/or new scores can be used in the determination. If User 21 is not authenticated after presenting the maximum number of question sets specified, based on the configuration, or otherwise available, User 21 can be denied authentication, and/or in some embodiments, User 21 can be informed to seek authentication using Manual Mode (e.g., by dialing a 1-800 telephone number), as indicated at 212 in FIG. 2. In informing User 21, a phone number, a user ID and/or an authentication application number can be provided to User 21.

In the FIG. 2 embodiment, the configuration data provided by Customer 13 can include values for the maximum number of attempts at authentication by User 21 within a configured timeframe using interface 19 of Customer 13. If the maximum number of attempts is exceeded within the specified timeframe, based on tracking of received identity information, e.g., in databases 102, as determined at 230, the user can also be informed (212) to seek authentication using Manual Mode. For example, based on one exemplary configuration, if attempts by User 21 exceed two within a thirty-seven day period and such attempts are associated with the same Customer 13, User 21 can be denied authentication, and/or provided a 1-800 telephone number and a User ID or Application Number, and User 21 can be informed that Manual Mode is necessary. If User 21 has not attempted authentication more than twice from the same Customer 13 within the time period, the question set formulation can be performed as described previously relative to FIG. 2. Depending on the configuration data provided by Customer 13, User 21 can be provided the same or different question sets upon subsequent authentication attempts.

Figure 3:
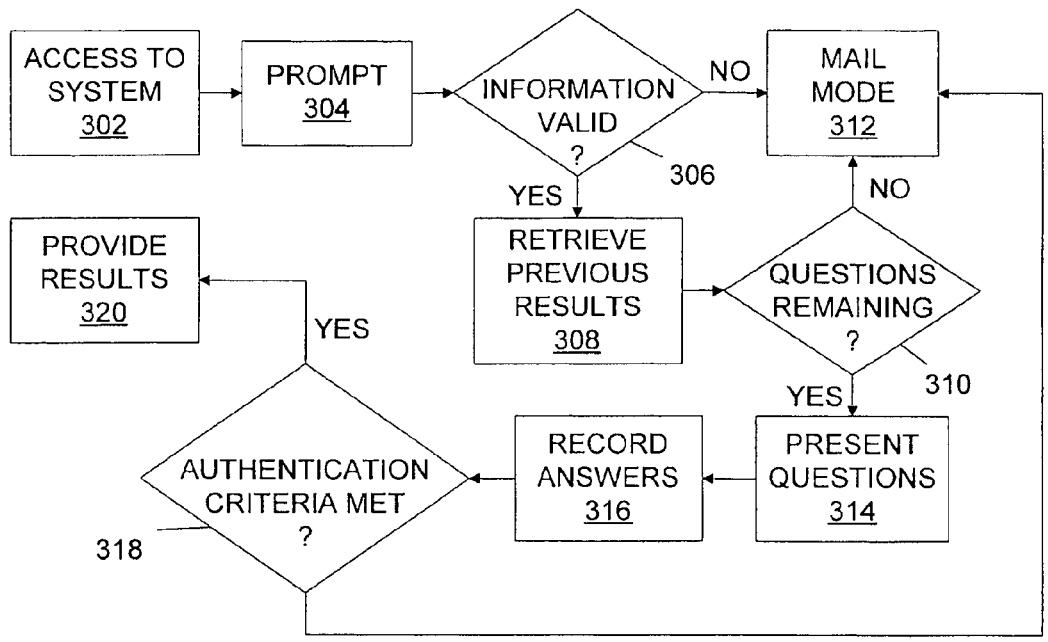
FIG. 3 illustrates a flow chart of a manual method of authentication.

Referring to FIG. 3, method 300 can illustrate the Manual Mode that User 21 can use when the Web Mode (method 200 of FIG. 2) fails to provide authentication. In the Manual Mode, User 21 dials a 1-800 telephone number provided to User 21, or otherwise accesses (302) an operator or other representative of authentication system 100. User 21 can be prompted (304) to provide an Application Number, User ID, identification number, or key, as provided to User 21 by the Web Mode of FIG. 2 when User 21 was informed (at 228 of method 200 in FIG. 2) of the Manual Mode. Providing that the Application Number is valid, as determined at 306, the representative can retrieve (308) the Web Mode results for User 21 from databases 102, and can determine, at 310, whether questions (from the formulated question sets) remain for oral presentation to User 21. If no questions remain, or if the User ID is not valid, User 21 can be informed (312) to pursue authentication using the Mail Mode of Figure D and described below.

In the Manual Mode of FIG. 3, when the User's ID is proper and question/answer pairings can be verbally posed, the operator can orally present questions to User 21, as at 314. Authentication system 100 can determine the questions to be presented orally based on the configuration data input by Customer 13. As in the Web Mode of FIG. 2, the oral questions can be presented to User 21 orally in the fill-in-the-blank format. The operator can manually record (316) the answers received from User 21, and can determine (318), typically manually, if the authentication criteria is satisfied. If Manual Mode authentication is achieved, the authentication decision can be provided (320) to Intermediary 15, Customer 13, and/or User 21. In one example, the authentication results can be provided using email. Other means of providing results, including phone, mail, and/or direct delivery, can also be utilized. In the embodiment of FIG. 3, if authentication is not obtained using Manual Mode, User 21 can be advised (322) to pursue authentication based on Mail Mode.

Figure 4:
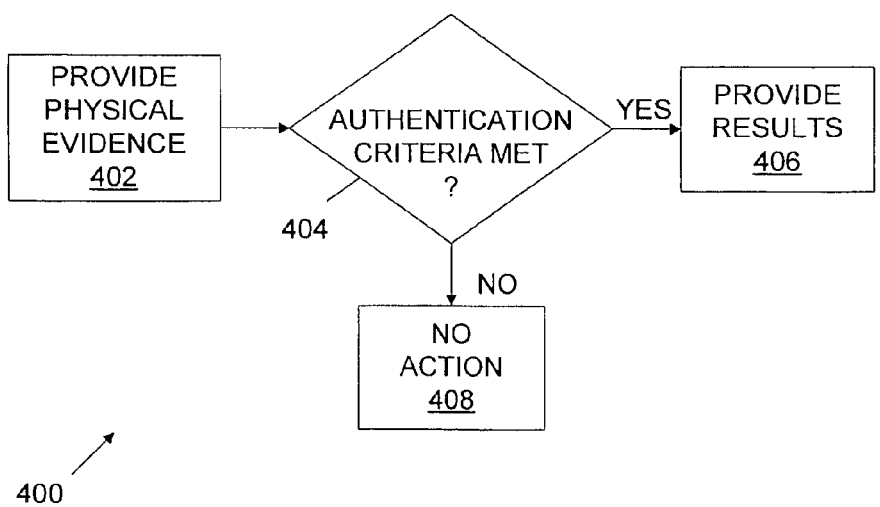
FIG. 4 illustrates a flow chart of a method of authentication using physical specimens for authentication.

In Mail Mode, as illustrated by method 400 of FIG. 4, User 21 can be instructed to mail or otherwise provide physical specimens of authentication, as at 402. The authentication criteria determination at 404 can be performed manually in Mail Mode, and positive authentication results can be provided (406) to Intermediary 15, Customer 15 and/or User 21. As in the Mail Mode of FIG. 3, results can be provided via email, phone, mail, direct delivery, and/or other means of providing results. If authentication is not obtained using Mail Mode, no action is taken, as indicated at 408.

Those of ordinary skill will also recognize, as provided herein, that one or more of the data sources can be a business/corporate data source, where the User 21 can be an employee or another associated with and/or affiliated with a business/corporation, etc., and through such association and/or affiliation, such User 21 would have knowledge of information that may be in the business/corporate data source. Such business/corporate data source could include, for example, business addresses, telephone numbers, passwords, security information, PIN numbers, factual information, and other information, with such examples provided for illustration and not limitation.

The systems and implementations thereof described herein may not be limited to particular components or configurations. For example, system 100 and method 200 can operate on a variety of networks, including networks supporting the Internet Protocol (IP), broadband networks, DSL (Digital Subscriber Line), FTTP (Fiber to the Premise), and WiFi (a wireless network specification). System 200 can be distributed among a number of network nodes that can communicate and cooperate over a network, such as an intranet and/or the Internet, to provide users with a seamless interface experience. In addition, system 100 can be configured for operation with one of a number of devices capable of accessing system 100 through a network, including personal computers, wireless phones, PDA's and the like.

Though not specifically shown in FIG. 1, system 100 can include volatile memory and non-volatile memory for storing data, such as databases 102, and other data corresponding to input and output values and other intermediate computations for the method 200. The memory can include instructions for executing the method 200, which can be transferred, in the course of operation, from the non-volatile memory to the volatile memory and to the processor for execution.

Additionally, the flow charts of FIGS. 2-4 can illustrate exemplary implementations of methods 200-400, respectively, and other configurations can be contemplated and/or other actions, decisions, menus and the like can be included. Further, it can be understood that system components, e.g., modules 104, 106, etc., can include and/or be combined into one or more components for interfacing with User 21 and for performing the methods described herein.

The methods and systems described herein are not limited to a particular hardware or software configuration, and may find applicability in many computing or processing environments. The methods and systems can be implemented in hardware or software, or a combination of hardware and software. The methods and systems can be implemented in one or more computer programs, where a computer program can be understood to include one or more processor executable instructions. The computer program(s) can execute on one or more programmable processors, and can be stored on one or more storage medium readable by the processor (including volatile and non-volatile memory and/or storage elements), one or more input devices, and/or one or more output devices. The processor thus can access one or more input devices to obtain input data, and can access one or more output devices to communicate output data. The input and/or output devices can include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) can be implemented using one or more high level procedural or object-oriented programming languages to communicate with a computer system; however, the program(s) can be implemented in assembly or machine language, if desired. The language can be compiled or interpreted.

As provided herein, the processor(s) can thus be embedded in one or more devices that can be operated independently or together in a networked environment, where the network can include, for example, a Local Area Network (LAN), wide area network (WAN), and/or can include an intranet and/or the internet and/or another network. The network(s) can be wired or wireless or a combination thereof and can use one or more communications protocols to facilitate communications between the different processors. The processors can be configured for distributed processing and can utilize, in some embodiments, a client-server model as needed. Accordingly, the methods and systems can utilize multiple processors and/or processor devices, and the processor instructions can be divided amongst such single or multiple processor/devices.

The device(s) or computer systems that integrate with the processor(s) can include, for example, a personal computer(s), workstation (e.g., Sun, HP), personal digital assistant (PDA), handheld device such as cellular telephone, laptop, handheld, or another device capable of being integrated with a processor(s) that can operate as provided herein. Accordingly, the devices provided herein are not exhaustive and are provided for illustration and not limitation.

References to "a microprocessor" and "a processor", or "the microprocessor" and "the processor," can be understood to include one or more microprocessors that can communicate in a stand-alone and/or a distributed environment(s), and can thus can be configured to communicate via wired or wireless communications with other processors, where such one or more processor can be configured to operate on one or more processor-controlled devices that can be similar or different devices. Use of such "microprocessor" or "processor" terminology can thus also be understood to include a central processing unit, an arithmetic logic unit, an application-specific integrated circuit (IC), and/or a task engine, with such examples provided for illustration and not limitation.

Furthermore, references to memory, unless otherwise specified, can include one or more processor-readable and accessible memory elements and/or components that can be internal to the processor-controlled device, external to the processor-controlled device, and/or can be accessed via a wired or wireless network using a variety of communications protocols, and unless otherwise specified, can be arranged to include a combination of external and internal memory devices, where such memory can be contiguous and/or partitioned based on the application. Accordingly, references to a database can be understood to include one or more memory associations, where such references can include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, can include one or more intranets and/or the internet. References herein to microprocessor instructions or microprocessor-executable instructions, in accordance with the above, can be understood to include programmable hardware.

Unless otherwise stated, use of the word "substantially" can be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun can be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, can be understood to so communicate, be associated with, and or be based on in a direct and/or indirect manner, unless otherwise stipulated herein.

Accordingly, many additional changes in the details and arrangement of parts, herein described and illustrated, can be made by those skilled in the art. It will thus be understood that the following claims are not to be limited to the embodiments disclosed herein, can include practices otherwise than specifically described, and are to be interpreted as broadly as allowed under the law.

What is claimed is:
1. A method, comprising:
receiving, using one or more processing units, identity information corresponding to an identity;
accessing, using the one or more processing units, one or more data sources using the identity information, wherein accessing includes obtaining additional data associated with the identity information;
accessing, using the one or more processing units, a collection of questions;
generating, using the one or more processing units, one or more answers corresponding to one or more questions in the collection of questions using the additional data associated with the identity information;
generating, using the one or more processing units, one or more question sets using the one or more questions that have corresponding answers, wherein the questions sets are generated according to a ranking of the one or more questions and corresponding answers;
outputting, using the one or more processing units, a question subset from the one or more question sets;
receiving, using the one or more processing units, one or more responses to the question subset, wherein each question in the question subset has an associated correctness criteria, wherein each response to a question is categorized according to the correctness criteria associated with that question, and wherein the correctness criteria includes partially correct response criteria, correct response criteria, and incorrect response criteria,
wherein the correct response criteria includes values between a first minimum threshold value and a first maximum threshold value, and the partially correct response criteria includes values that are between a second minimum threshold value and a second maximum threshold value and not between the first minimum threshold value and the first maximum threshold value, wherein the second minimum threshold value is less than the first minimum threshold value and the second maximum threshold value is greater than the first maximum threshold value;
assigning, using the one or more processing units, a score to each categorized response based on a multiplier, wherein a multiplier for the correct response criteria is different than a multiplier for the partially correct response criteria; and
authenticating, using the one or more processing units, the identity using the assigned scores.

2. The method of claim 1, wherein partially correct response criteria differs from correct response criteria and incorrect response criteria for each question in the question subset.

3. The method of claim 1, wherein each of the one or more question sets includes two or more questions.

4. The method of claim 1, wherein generating the one or more answers includes using the identity information in addition to the additional data associated with the identity information.

5. The method of claim 1, wherein the one or more question sets are generated according to a configurable question-set criteria.

6. The method of claim 5, wherein the question-set criteria includes one or more ranks for the one or more questions that have corresponding answers, and wherein the one or more ranks are used to generate the one or more question sets.

7. The method of claim 1, wherein authenticating includes using a configurable authentication criteria.

8. The method of claim 1, further comprising:
outputting, using the one or more processing units, one or more additional questions from the one or more question sets when authentication fails;
receiving, using the one or more processing units, one or more additional responses to the one or more additional questions, wherein the one or more additional responses are categorized;
assigning, using the one or more processing units, a score to each categorized additional response; and
authenticating, using the one or more processing units, using the assigned scores for the one or more additional responses.

9. The method of claim 8, wherein authenticating also includes using the assigned scores for the one or more responses.

10. The method of claim 1, further comprising:
outputting, using the one or more processing units, instructions related to one or more manual methods of authentication when authentication fails.

11. The method of claim 10, wherein the one or more manual methods of authentication include telephone, mail, or e-mail authentication.

12. The method of claim 1 further comprising:
determining that the identity is not authenticated based on the one or more responses to the question subset;
outputting a subsequent question subset in response to the determination that the identity is not authenticated based on the one or more responses to the question subset;
receiving, using the one or more processing units, one or more responses to the subsequent question subset; and
categorizing, using the one or more processing units, each of the responses to the subsequent question subset according to the correctness criteria associated with that question;
assigning, using the one or more processing units, scores to each categorized subsequent response; and
wherein the authenticating the identity further uses the scores assigned to each subsequent response.

13. The method of claim 1 further comprising identifying subsequent authentication attempts for the identity prior to generating the one or more question sets; and providing a different question set from a previously provided question set.

14. The method of claim 1 wherein the correctness criteria for at least one of the one or more responses to the question subset comprises:
a first value identified as a correct value; a range of values identified as partially correct;
and all other values identified as incorrect.

15. A system, comprising:
one or more processors;
a non-transitory computer-readable storage medium containing instructions configured to cause the one or more processors to perform operations, including:
receiving identity information corresponding to an identity;
accessing one or more data sources using the identity information, wherein accessing includes obtaining additional data associated with the identity information;
accessing a collection of questions;
generating one or more answers corresponding to one or more questions in the collection of questions using the additional data associated with the identity information;
generating one or more question sets using the one or more questions that have corresponding answers, wherein the questions sets are generated according to a ranking of the one or more questions and corresponding answers;
outputting a question subset from the one or more question sets;
receiving one or more responses to the question subset, wherein each question in the question subset has an associated correctness criteria, wherein each response to a question is categorized according to the correctness criteria associated with that question, and wherein the correctness criteria includes partially correct response criteria, correct response criteria, and incorrect response criteria,
wherein the correct response criteria includes values between a first minimum threshold value and a first maximum threshold value, and the partially correct response criteria includes values that are between a second minimum threshold value and a second maximum threshold value and not between the first minimum threshold value and the first maximum threshold value, wherein the second minimum threshold value is less than the first minimum threshold value and the second maximum threshold value is greater than the first maximum threshold value;
assigning a score to each categorized response based on a multiplier, wherein a multiplier for the correct response criteria is different than a multiplier for the partially correct response criteria; and
authenticating the identity using the assigned scores.

16. The system of claim 15, wherein partially correct response criteria differs from correct response criteria and incorrect response criteria for each question in the question subset.

17. The system of claim 15, wherein each of the one or more question sets includes two or more questions.

18. The system of claim 15, wherein generating the one or more answers includes using the identity information in addition to the additional data associated with the identity information.

19. The system of claim 15, wherein the one or more question sets are generated according to a configurable question-set criteria.

20. The system of claim 19, wherein the question-set criteria includes one or more ranks for the one or more questions that have corresponding answers, and wherein the one or more ranks are used to generate the one or more question sets.

21. The system of claim 15, wherein authenticating includes using a configurable authentication criteria.

22. The system of claim 15, wherein authenticating is performed over an electronic network.

23. The system of claim 15, wherein authenticating is performed over a telephone network.

24. The system of claim 15, further comprising instructions to cause the one or more processors to perform operations, including:
    outputting one or more additional questions from the one or more question sets when authentication fails;
    receiving one or more additional responses to the one or more additional questions, wherein the one or more additional responses are categorized;
    assigning a score to each categorized additional response; and
    authenticating using the assigned scores for the one or more additional responses.

25. The system of claim 24, wherein authenticating also includes using the assigned scores for the one or more responses.

26. The system of claim 15, further comprising instructions to cause the one or more processors to perform operations, including:
    outputting instructions related to one or more manual methods of authentication when authentication fails.

27. The system of claim 26, wherein the one or more manual methods of authentication include telephone, mail, or e-mail authentication.

28. A computer program product, tangibly embodied in a non-transitory machine readable storage medium, including instructions stored thereon configured to cause a data processing apparatus to:
    receive identity information corresponding to an identity;
    access one or more data sources using the identity information, wherein accessing includes obtaining additional data associated with the identity information;
    access a collection of questions;
    generate one or more answers corresponding to one or more questions in the collection of questions using the additional data associated with the identity information;
    generate one or more question sets using the one or more questions that have corresponding answers, wherein the questions sets are generated according to a ranking of the one or more questions and corresponding answers;
    output a question subset from the one or more question sets;
    receive one or more responses to the question subset, wherein each question in the question subset has an associated correctness criteria, wherein each response to a question is categorized according to the correctness criteria associated with that question, and wherein the correctness criteria includes partially correct response criteria, correct response criteria, and incorrect response criteria,
    wherein the correct response criteria includes values between a first minimum threshold value and a first maximum threshold value, and the partially correct response criteria includes values that are between a second minimum threshold value and a second maximum threshold value and not between the first minimum threshold value and the first maximum threshold value, wherein the second minimum threshold value is less than the first minimum threshold value and the second maximum threshold value is greater than the first maximum threshold value;
    assign a score to each categorized response based on a multiplier, wherein a multiplier for the correct response criteria is different than a multiplier for the partially correct response criteria; and
    authenticate the identity using the assigned scores.

29. The computer program product of claim 28, wherein partially correct response criteria differs from correct response criteria and incorrect response criteria for each question in the question subset.

30. The computer program product of claim 28, wherein each of the one or more question sets includes two or more questions.

31. The computer program product of claim 28, wherein generating the one or more answers includes using the identity information in addition to the additional data associated with the identity information.

32. The computer program product of claim 28, wherein the one or more question sets are generated according to a configurable question-set criteria.

33. The computer program product of claim 32, wherein the question-set criteria includes one or more ranks for the one or more questions that have corresponding answers, and wherein the one or more ranks are used to generate the one or more question sets.

34. The computer program product of claim 28, wherein authenticating includes using a configurable authentication criteria.

35. The computer program product of claim 28, further comprising instructions configured to cause a data processing apparatus to:
    output one or more additional questions from the one or more question sets when authentication fails;
    receive one or more additional responses to the one or more additional questions, wherein the one or more additional responses are categorized;
    assign a score to each categorized additional response; and
    authenticate using the assigned scores for the one or more additional responses.

36. The computer program product of claim 35, wherein authenticating also includes using the assigned scores for the one or more responses.

37. The computer program product of claim 28, further comprising instructions configured to cause a data processing apparatus to:
    output instructions related to one or more manual methods of authentication when authentication fails.

38. The computer program product of claim 37, wherein the one or more manual methods of authentication include telephone, mail, or e-mail authentication.

* * * * *